US007987106B1

(12) United States Patent
 Aykin

(10) Patent No.: US 7,987,106 B1
(45) Date of Patent: Jul. 26, 2011

(54) SYSTEM AND METHODS FOR FORECASTING TIME SERIES WITH MULTIPLE SEASONAL PATTERNS

(76) Inventor: Turgut Aykin, Atlantic Highlands, NJ (US)

( * ) Notice: Subject to any disclaimer, the term of this patent is extended or adjusted under 35 U.S.C. 154(b) by 1333 days.

(21) Appl. No.: 11/446,711

(22) Filed: Jun. 5, 2006

(51) Int. Cl.
 *G06F 9/44* (2006.01)
(52) U.S. Cl. ...................................... 705/7.11
(58) Field of Classification Search ........................ None
 See application file for complete search history.

(56) References Cited

U.S. PATENT DOCUMENTS

| | | | | | |
|---|---|---|---|---|---|
| 4,700,295 | A * | 10/1987 | Katsof et al. | ............... | 705/10 |
| 5,325,292 | A * | 6/1994 | Crockett | ............... | 705/9 |
| 6,094,651 | A * | 7/2000 | Agrawal et al. | ............... | 1/1 |
| 6,125,105 | A * | 9/2000 | Edwards et al. | ............... | 370/230 |
| 6,205,431 | B1 * | 3/2001 | Willemain et al. | ............... | 705/10 |
| 6,611,726 | B1 * | 8/2003 | Crosswhite | ............... | 700/99 |
| 6,745,150 | B1 * | 6/2004 | Breiman | ............... | 702/181 |
| 6,834,266 | B2 * | 12/2004 | Kumar et al. | ............... | 705/10 |
| 6,993,044 | B2 * | 1/2006 | McKinnon et al. | ............... | 370/468 |
| 7,039,559 | B2 * | 5/2006 | Froehlich et al. | ............... | 702/187 |
| 7,124,055 | B2 * | 10/2006 | Breiman | ............... | 702/181 |
| 7,251,589 | B1 * | 7/2007 | Crowe et al. | ............... | 702/189 |
| 7,280,988 | B2 * | 10/2007 | Helsper et al. | ............... | 706/26 |
| 7,437,308 | B2 * | 10/2008 | Kumar et al. | ............... | 705/10 |
| 7,610,214 | B1 * | 10/2009 | Dwarakanath et al. | ............... | 705/10 |
| 7,664,671 | B2 * | 2/2010 | Shan | ............... | 705/10 |
| 7,739,143 | B1 * | 6/2010 | Dwarakanath et al. | ............... | 705/10 |
| 7,848,946 | B2 * | 12/2010 | Acharya et al. | ............... | 705/10 |
| 7,856,497 | B2 * | 12/2010 | McKinnon et al. | ............... | 709/224 |
| 2002/0169658 | A1 * | 11/2002 | Adler | ............... | 705/10 |
| 2002/0194039 | A1 * | 12/2002 | Bhaskaran et al. | ............... | 705/7 |
| 2003/0144897 | A1 * | 7/2003 | Burruss et al. | ............... | 705/10 |
| 2003/0225659 | A1 * | 12/2003 | Breeden et al. | ............... | 705/36 |
| 2004/0102937 | A1 * | 5/2004 | Ibrahim | ............... | 703/2 |
| 2004/0181370 | A1 * | 9/2004 | Froehlich et al. | ............... | 702/187 |
| 2004/0220771 | A1 * | 11/2004 | Breiman | ............... | 702/181 |
| 2005/0256759 | A1 * | 11/2005 | Acharya et al. | ............... | 705/10 |
| 2007/0016542 | A1 * | 1/2007 | Rosauer et al. | ............... | 706/21 |
| 2007/0094067 | A1 * | 4/2007 | Kumar et al. | ............... | 705/10 |
| 2007/0100680 | A1 * | 5/2007 | Kumar et al. | ............... | 705/10 |
| 2007/0239753 | A1 * | 10/2007 | Leonard | ............... | 707/101 |
| 2008/0059284 | A1 * | 3/2008 | Solotorevsky et al. | ............... | 705/10 |

OTHER PUBLICATIONS

Taylor JW (2003). Exponential Smoothing with a Damped Multiplicative Trend. International Journal of Forecasting. 19: 715-725.*
Taylor JW (2003). Short-Term Electricity Demand Forecasting Using Double Seasonal Exponential Smoothing. The Journal of the Operational Research Society. 54(8): 799-805.*
Gardner ES (2005). Exponential smoothing: The state of the art- Part II. Jun. 3, 2005. Bauer College of Business. 1-81.*
Hyndman RJ, Kehler Ab, Snyder RD and Grose S (2002). A state space framework for automatic forecasting using exponential smoothing methods. International Journal of Forecasting. 18: 439-454.*
Archibald BC and Koehler AB (2003). Normalization of seasonal factor in Winters' methods. International Journal of Forecasting. 19: 143-148.*

(Continued)

*Primary Examiner* — Romain Jeanty
*Assistant Examiner* — Brett Feeney

(57) ABSTRACT

A computer implemented system and methods for forecasting the future values of a time series with multiple seasonal cycles are described. The forecasting method of the present invention include 1) two multi-seasonal exponential smoothing methods, 2) the seasonal sub-series method splitting a time series into multiple sub-series, and 3) the aggregate-to-period forecasting method.

19 Claims, 11 Drawing Sheets

OTHER PUBLICATIONS

Billah B, King ML, Sndyer Rd and Koehler AB (2006). Exponential smoothing model selection for forecasting. International Journal of Forecasting. 22: 239-247.*

Dickey Da et al. (2006). Forecasting Method-an Overview of Models and Techniques. SAS Institute Inc. 2006. SAS OnlineDoc® 9.1.3. Cary, NC: SAS Institute Inc. 1-262.*

Durbin, J. and Murphy, M. (1975) Seasonal adjustment based on a mixed additive: multiplicative model. Journal of the Royal Statistical Society: Series A (General). 138 (3), pp. 385-410.*

Hasza DP and Fuller WA (1982). Testing for Nonstationary Parameter Specifications in Seasonal Time Series Models. The Annals of Statistics. vol. 10, No. 4 (Dec. 1982), pp. 1209-1216.*

Holt CC (2004). Forecasting seasonals and trends by exponentially weighted moving averages. International Journal of Forecasting. 20: 5-10.*

Hyndman RJ (2006). Automatic time series forecasting. Monash University, Australia (Feb.). 1-2.*

De Gooijer JG and Hyndman RJ (2006). 25 years of time series forecasting. International Journal of Forecasting. 22: 443-473.*

Lim C and McAleer M (2001). Monthly Seasonal Variations Asian Tourism to Australia. Annals of Tourism Research, vol. 28, No. 1, pp. 68-82.*

Ozaki T and Thomson P (2002). A Non-linear Dynamic Model for Multiplicative Seasonal-trend Decomposition. Journal of Forecasting. 21: 107-124. PDF was rights protected: available at http://www.ism.ac.jp/~ozaki/publications/paper/2002_Ozaki_Thomson_jou_fore.pdf.*

Taylor JW (2006). Invited Comments on "Exponential Smoothing: The State of the Art—Part II" by E.S. Gardner, Jr. International Journal of Forecasting, 2006, vol. 22, pp. 671-672.*

* cited by examiner

SYSTEM AND METHODS FOR FORECASTING TIME SERIES WITH MULTIPLE SEASONAL PATTERNS

REFERENCES CITED

U.S. Patent Documents

| | | | |
|---|---|---|---|
| 4,700,295 | April, 1987 | Katsof et al., | 705/10 |
| 5,461,699 | October, 1995 | Arbabi et al. | 706/21 |
| 6,032,125 | February, 2000 | Ando | 705/10 |
| 6,125,105 | September, 2000 | Edwards et al. | 370/230 |
| 6,205,431 | March, 2001 | Willemain et al. | 705/10 |
| 6,745,150 | June, 2004 | Breiman | 702/181 |

OTHER REFERENCES

Box, G. E. P., G. M. Jenkins, and G. C. Reinsell, *Time Series Analysis: Forecasting and Control,* -$3^{rd}$ ed., Prentice-Hall, Englewood Cliff, N.J., 1994.

Gardner, E. S., "Exponential Smoothing: The State of the Art," *Journal of Forecasting,* 4, 1-28, 1985.

Hyndman, R. J., et al., "A State Space Framework for Automatic Forecasting Using Exponential Smoothing Methods," *International Journal of Forecasting,* 18, 439-454, 2002.

Makridakis, S., et al., *Forecasting: Methods and Applications,* John Wiley & Sons, New York, 1998.

Shiskin, J, et al., "The X-11 Variant of the Census Method II Seasonal Adjustment Program," Technical Paper No. 15, Bureau of the Census, 1967.

Taylor, J. W., "Short-term Electricity Demand Forecasting Using Double Seasonal Exponential Smoothing," *Journal of Operational Research Society,* 54, 799-805, 2003.

FIELD OF THE INVENTION

The invention pertains to the field of computer systems and computer implemented methods. More specifically, the invention pertains to computer implemented methods for forecasting time series with multiple seasonal patterns.

BACKGROUND OF THE INVENTION

In most commercial and industrial activities in fields such as manufacturing, retail, financial markets, call centers, energy systems, forecasting is one of the most important operational concerns. Forecasts are fundamental inputs to decision making and planning.

Various forecasting methods use the time series history of a variable for which forecasts of future values are desired. A time series is a set of observations of a variable that are ordered and identified by the time of observation (e.g. call volumes arriving at a call center recorded every half hour with the time of the day and date, average service time for the calls answered in a time interval, energy consumption every half hour with the time of the day and date).

Time series methods use the past values of a time series to identify patterns in the data to generate forecasts. Patterns that may exist in a time series include trend, seasonal patterns, and cyclical pattern. Most time series methods focus on modeling trend and only one seasonal cycle. For example, the exponential smoothing technique has three versions: i) single exponential smoothing generating smoothed values without any trend or seasonal pattern, ii) double exponential smoothing generating forecasts with smoothed values adjusted for trend, and iii) triple exponential smoothing generating forecasts by adjusting smoothed values for trend and one seasonal pattern (Makridakis, S., et al., 1998).

Although there are various forecasting methods that can model trend and seasonal pattern, almost all of the forecasting methods are limited to at most one seasonal pattern. These methods can model one seasonal pattern, but not any two or three at the same time. If a seasonal pattern is not modeled and included in forecasting, however, the accuracy of the resulting forecasts will be lower than otherwise. In call centers, for example, incoming calls may vary not only during the course of a day (intra-day variation) but also over the days of a week, and over different weeks of a year. In these centers, forecasting methods not incorporating multiple seasonal patterns will ignore one or more of the intraday, the day-of-week and the week-of-year patterns, and will result in forecasts with poor accuracy. Other examples of time series with multiple seasonal patterns include electrical energy consumption, stock prices, and activities in banks, hospitals, police stations, and other service, production, and financial systems.

The Autoregressive Integrated Moving Average (ARIMA) procedure proposed by Box and Jenkins (Box, et al., 1994), is known to have the capability to model multiple seasonal patterns. Another forecasting approach for time series with double seasonal patterns recently developed by Taylor (2003). It involves an extension of the triple exponential smoothing method (also know as Holt-Winters' method). The approach is based on the multiplicative version of the method that includes the seasonal effects in the form of multipliers applied to the trend and level based forecasts. The additive model, on the other hand, includes the seasonal effect in the form of an additive factor applied to the trend and level based forecasts. The additive seasonal effect modeling is more appropriate if the seasonal effect does not change with the current mean of a time series.

Given the limited availability of the forecasting methods that can be used for time series with multiple seasonal patterns, an objective of the present invention is to provide a new method for this type of time series using the additive version of the exponential smoothing method. Another objective of the present invention is to provide two general methods for time series and forecast processing that can be used with any forecasting method to capture multiple seasonal patterns. The present invention further comprises a computer system for applying, on one or more computers, the methods of the present invention to time series exhibiting multiple seasonal patterns.

SUMMARY OF THE INVENTION

The present invention comprises a forecasting method for forecasting the future values of a time series with multiple seasonality, two data and forecast processing methods for extending any forecasting method with capability to model one or more seasonal cycles to model additional seasonal cycles, and a computer system for implementing the methods of the invention. First, two versions of the exponential smoothing method for times series with multiple seasonal patterns (referred to as "Multi-seasonal Exponential Smoothing") are described. The method of the present invention provides steps for 1) predicting the level component, 2) predicting trend-based future values, 3) determining one seasonal pattern based adjustment needed in future forecasts, 4) determining a second seasonal pattern based adjustment needed in the future forecasts, and 5) combining (1) through (4) above to generate the forecasts.

The present invention further comprises a method for pre-processing a time series data to split it into sub-series (referred to as "Seasonal Sub-series Method"), one for each period in a seasonal pattern. For example, if a time series shows a daily seasonal pattern (the day-of-week pattern) over a week, then seven sub-series are formed, one for each day of the week. Forecasts are generated for each sub-stream by applying a forecasting method separate from the other sub-series. Thus, if the forecasting method selected incorporates one or more seasonal patterns in forecasting, the method of the present invention allows incorporating one or more additional seasonal patterns captured by splitting the time series data in to sub-series.

The present invention further comprises a method for pre-processing a time series—to aggregate data over the seasonal pattern with the shortest cycle length (in terms of the number of periods over which a seasonal pattern is observed). Thus, an aggregated data value is obtained for each seasonal cycle that now forms an aggregated period (referred to as "aggregate-to-period method"). Each aggregated period is associated with an aggregated time series value and corresponds to a cycle of the seasonal pattern with the shortest length. This approach then applies a forecasting method capable of modeling one or more seasonal patterns and trend to the aggregated data to generate forecasts of future values for the aggregated periods. Next, the un-aggregated data is used to forecast the period factors independent of the aggregated forecasts. Forecasts for aggregated periods are then "broken" down for the individual periods in each cycle of the shortest seasonal pattern by using period factors forecasted.

BRIEF DESCRIPTION OF THE DRAWINGS

The invention will be better understood by an examination of the following Detailed Description of the Preferred Embodiment, together with the accompanying drawings, in which.

DETAILED DESCRIPTION OF THE PREFERRED EMBODIMENT

I. Overview

Figure 1:
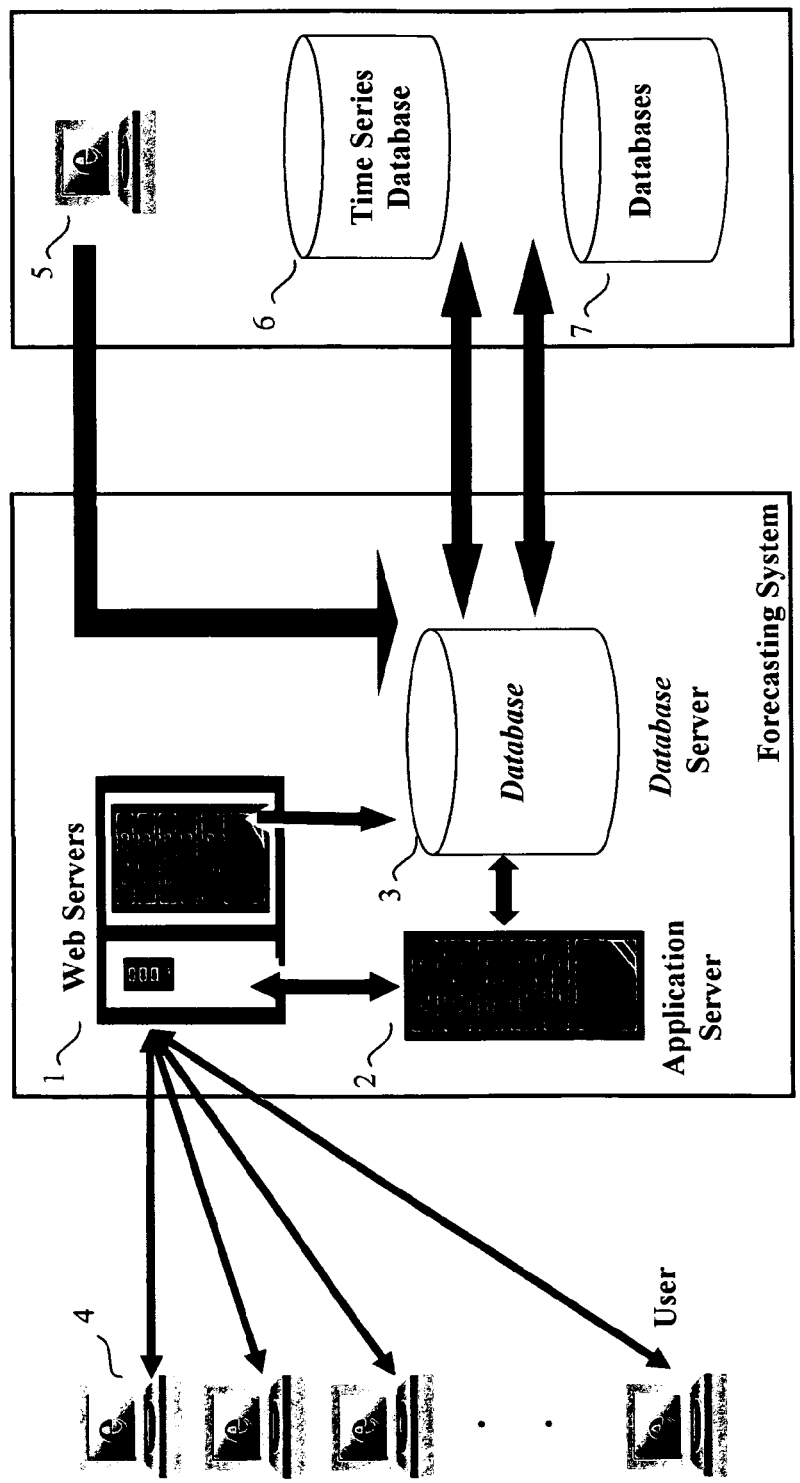
FIG. 1. shows a high-level system architecture of a computer system containing a forecasting program in accordance with the preferred embodiment of the invention.

The present invention comprises of new methods for predicting the future values of a times series exhibiting two or more seasonal patterns. A time series may also exhibit trend in addition to multiple seasonal patterns.

Every plan whether it involves the production of a product or call center operations requires a set of predictions (forecasts) about the future time periods, steps, and targets to be achieved over a time period. Forecasting is the process that provides the needed information on the future state of a system or process. Targets are set to assess the performance of a system. Plans are then developed to meet or exceed the targeted performance in the forecasted future expected system or process state. Thus, every plan involves a series of predictions for one or more time periods in the future. Since a plan is developed to achieve specific targets, its "success", the degree of achieving the targeted performance, depends largely on the accuracy of its assumptions including the forecasted future state of the system or process (described by a set of future parameter values), and system's ability to implement and execute the plan. Hence, forecasting is a critical process that affects the performance of any system.

A time series may exhibit a number of patterns. These include trend, seasonal, cyclical, and irregular patterns. These patterns show the relationship between the past values of a parameter and time. Time series forecasting methods analyze various time series patterns over time to project the pattern components identified and included in the method to predict the future values. Any significant pattern that is not captured by a forecasting method would affect the accuracy of the forecasts generated over time.

The present invention describes three approaches to forecasting when the time series has more than one seasonal cycle. The first method of the invention, the multi-seasonal exponential smoothing method, extends the triple-exponential smoothing method to times series with multiple seasonal patterns. In addition to this method, two other, more general methods that are applicable with any forecasting methodology for time series with a single or double seasonal patterns, or any multi-seasonal forecasting method are presented. These methods pre-process the time series values, either by splitting them into sub-series (the seasonal sub-series method) or aggregating them (the aggregate-to-period method), before a forecasting method is applied to generate forecasts.

The methods of the present invention are described herein with specific examples as part of the preferred embodiment. However, the examples are only illustrative and do not restrict in any way the scope and the applications of the methods of the invention in other settings. These descriptions of the methods of the invention are exemplary, and a person with ordinary skills in the art will appreciate that many variations of the methods of the invention and using them in combination are possible and within the scope of the invention.

The multi-seasonal exponential smoothing method of the present invention incorporates trend, and two or more seasonal patterns. Two versions of the forecasting method of the invention are based on the pure additive, and a hybrid (a combination of multiplicative and additive) version of the exponential smoothing approach. Different than the method of Taylor (2003), the additive seasonality version of the exponential smoothing method of the invention includes all seasonal effects in the form of additive factors applied to the trend based forecasts. The hybrid version of the method of the invention includes some of the seasonal effects in the form of multiplicative factors, and the other seasonal effects in the form of additive factors.

The invention also comprises a computer system for forecasting future values of a time series with multiple seasonal patterns with the following functionality: 1) a mechanism to specify whether the whole time series forecasting approach (i.e. applying a forecasting method to the entire time series history in a manner consistent with the well-know time series forecasting practice, Makridakis, S., et al., 1998), seasonal sub-series method, aggregate-to-period forecasting method or Multi-seasonal exponential smoothing method of the invention to be used to predict the future values of a time series, 2) a mechanism for specifying the seasonal patterns and their lengths to be considered, 3) a mechanism for selecting a forecasting method when the seasonal sub-series method or aggregate-to-period method is applied, 4) a mechanism for entering the time series history start and end dates, forecast horizon start and end dates, 5) a mechanism for either inputting time series data directly or transferring data from another computer, database or storage system, 6) a mechanism for a user of the computer system to input the needed parameters to specify the forecasting method to be used, 7) a mechanism for predicting at least one future value of the time series using the methods of the invention, and 8) means for storing and reporting the forecasts generated.

Figure 2:
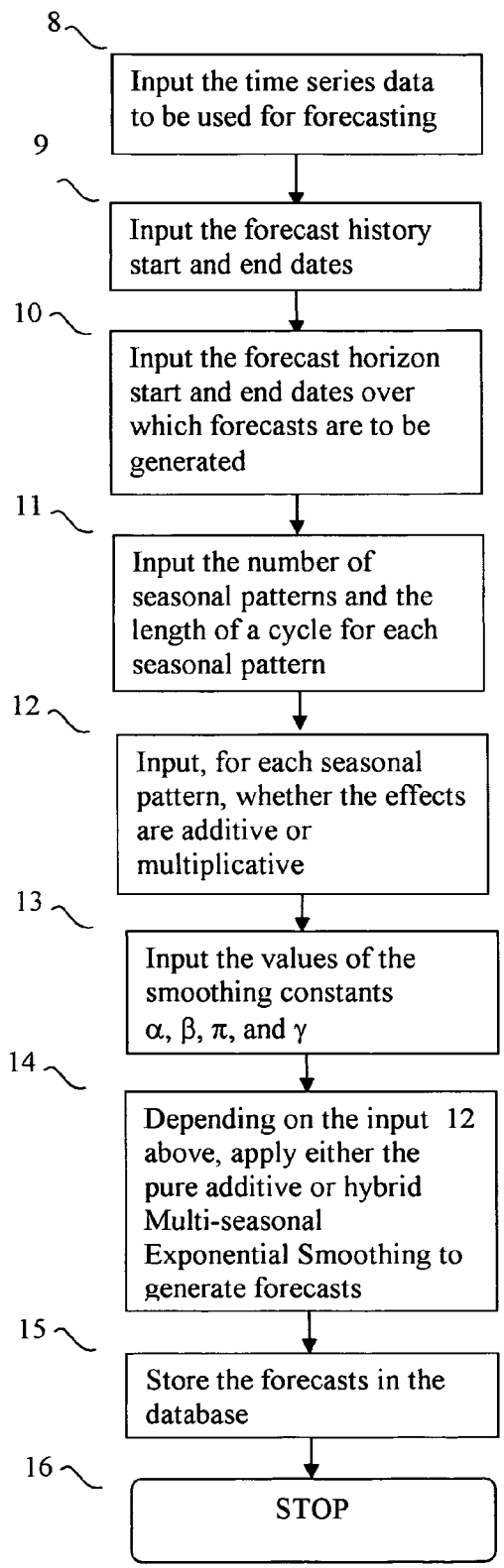
FIG. 2. shows a flowchart of the preferred embodiment for the multi-seasonal exponential smoothing forecasting method of the invention.
Figure 3A:
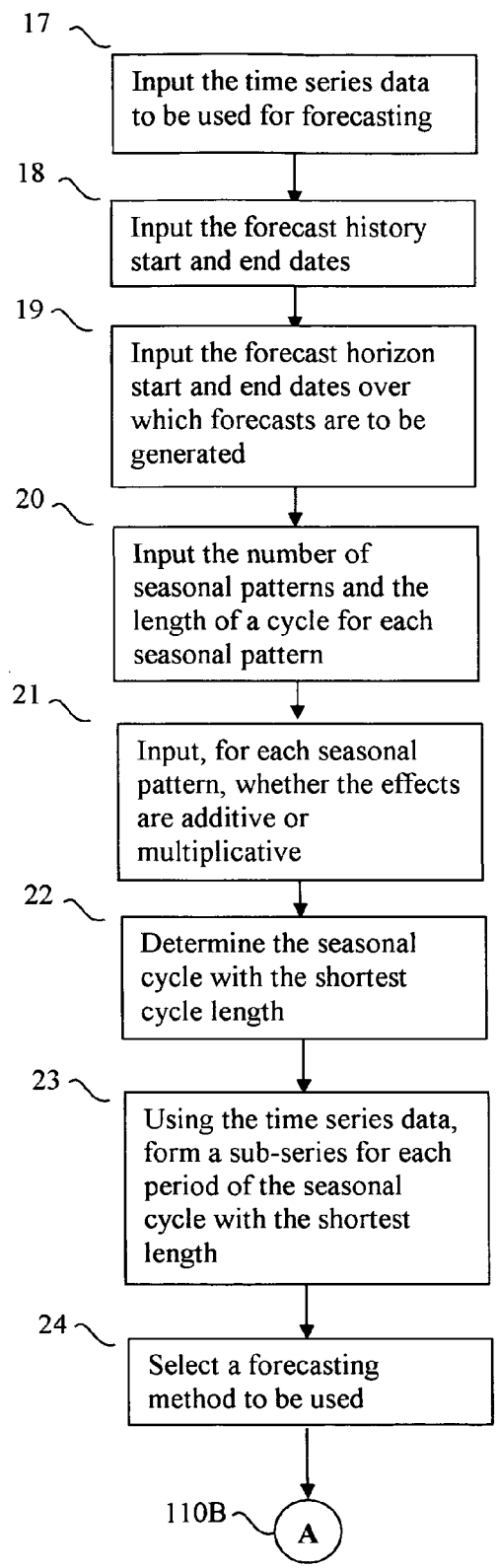
FIG. 3A.
Figure 3B:
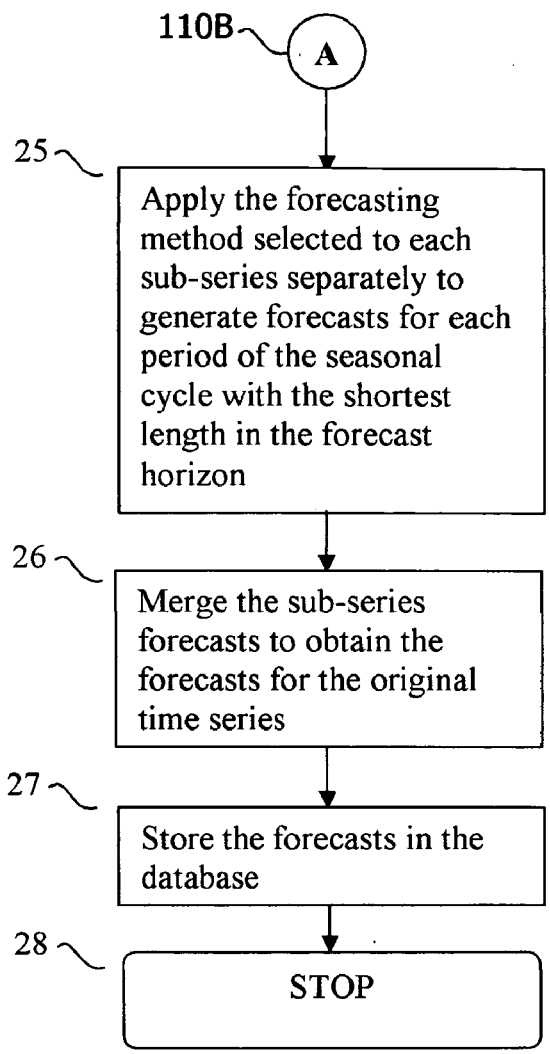
FIG. 3B. show a flowchart of the preferred embodiment for the seasonal sub-series forecasting method of the invention.

Unless indicated otherwise, a processor or a group of processors such as computers or other devices with a code, software, or any other type of programmable medium stored on them perform all functions and methods of the present invention. A high-level system architecture of a computer system containing the methods of the invention and—code in one embodiment is shown in FIG. 1. FIG. 2 shows a flowchart of the multi-seasonal exponential smoothing method, FIG. 3A and FIG. 3B shows a flowchart of the seasonal sub-series forecasting method, and FIG. 4A and FIG. 4B shows a flowchart of the aggregate-to-period forecasting method of the invention.

In one embodiment, the functionality and methods of the invention with a code are stored on a group of computers 1, 2, 3, in FIG. 1. The system of the present invention is accessed via other computers or terminal devices 4 which also provide an input mechanism and a user interface. The processors or computers 1, 2, and 3 also communicate with the other devices including other information sources such as interne sites 5, database devices, hardware (for example, an automatic call distributor) or computers 6 where past time series data may be stored, and other databases 7, through electronic, manual, or other forms of interfaces to provide data and information exchange.

Figure 4A:
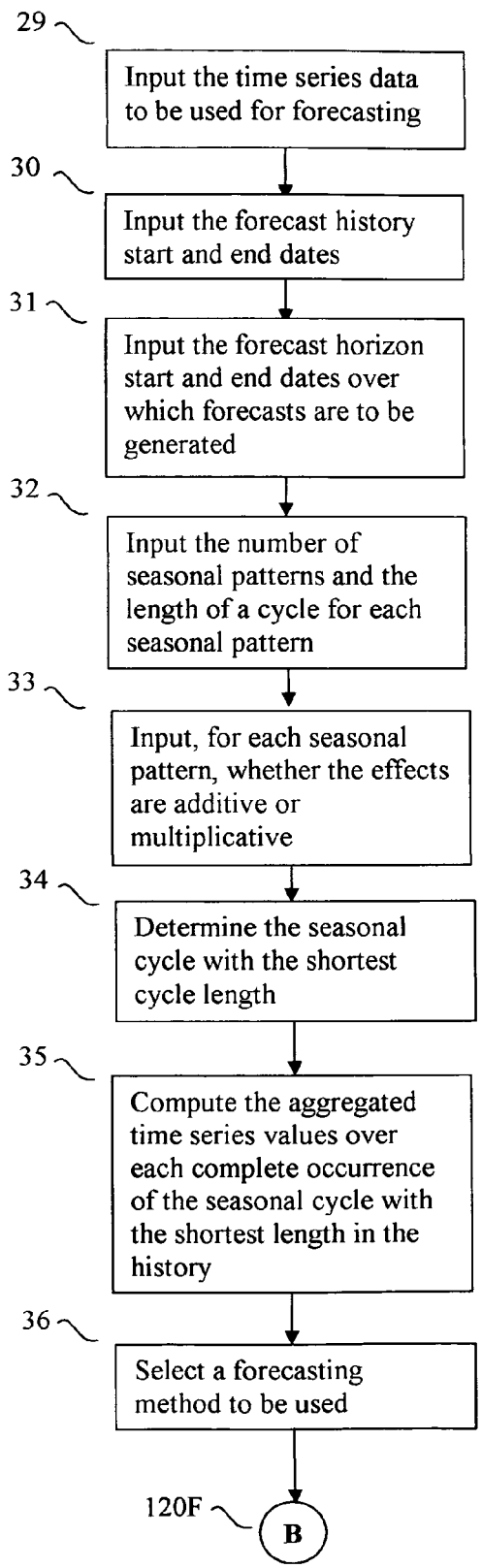
FIG. 4A.
Figure 4B:
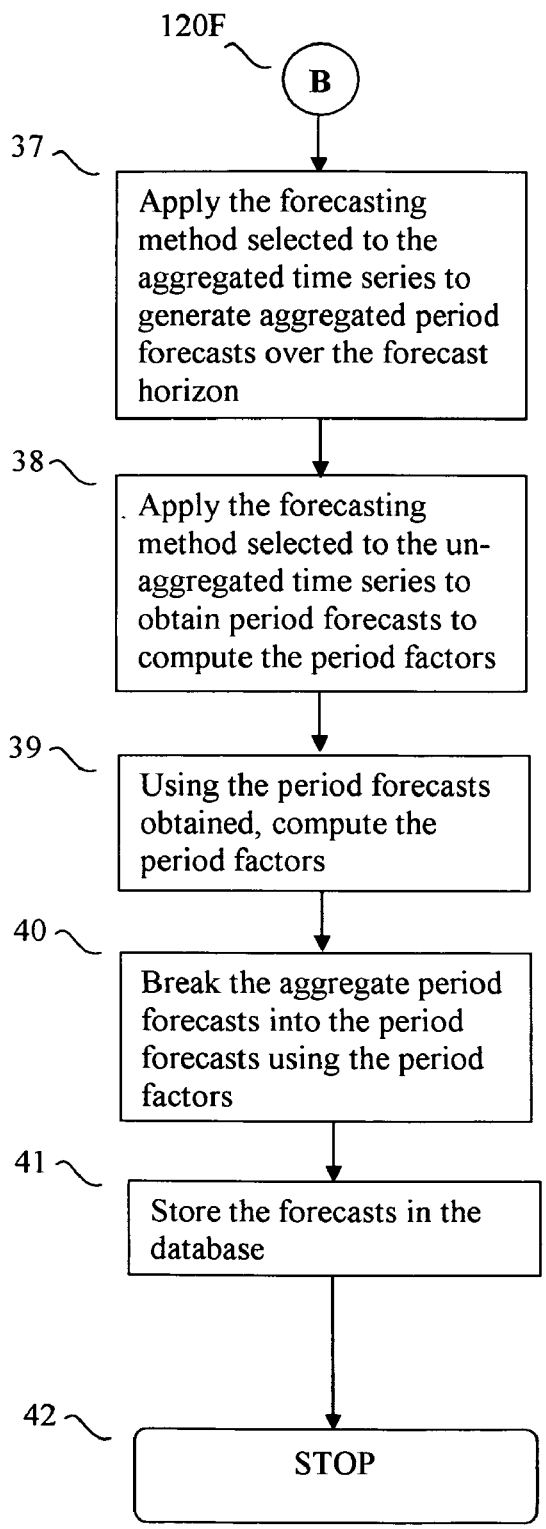
FIG. 4B. show a flowchart of the preferred embodiment for the aggregate-to-period forecasting method of the invention.

Referring to FIG. 2. through FIG. 4A and FIG. 4B, the methods of the present invention are applied to a set of time series data associated with, for example, the number of calls received (referred to as "call volumes') and/or handling times, email and fax volumes and/or handling times, web chat volumes and/or handling times, etc. at a call center. The methods of the invention are also applicable to data from manufacturing, government, finance, energy production, etc. Furthermore, the methods of the invention are not limited to one time series. The methods and systems described here may also be applied to multiple time series to generate forecasts for each or a combination of them (e.g. time series groups).

The time series data to be analyzed in generating forecasts are either stored in one or more databases 3, 5, 6, 7, and received into the system of the invention, or entered manually through the data input mechanism available through the terminals or computers 4 into it. The historical time series data 8 to be analyzed in generating forecasts are stored in the memory of the processor or computer where the code for the system of the present invention is residing. Referring to FIG. 1.-FIG. 4A and FIG. 4B, the other information provided either through a database or through the input mechanism 4 include the forecast history start and end dates 9, 18, and 30 since not all historical time series data may be included in forecasting; the forecast horizon start and end dates 10, 19, and 31 over which forecasts are to be generated by the system of the invention. The length of each seasonal cycle is determined and inputted in terms of number of periods 11, 20, and 32.

II. Multi-seasonal Exponential Smoothing Method

A version of the forecasting method of the invention is described for a time series with two seasonal patterns with different cycle lengths. However, this description of the method of the invention is exemplary, and a person with ordinary skills in the art will appreciate that extension into the time series with more than two seasonal patterns, and other types of seasonal patterns (e.g. any number and/or combination of the intra-day, day-of-week, week-of-month, day-of-quarter, week-of-quarter, month-of-quarter, day-of month, day-of-year, week-of-year, month-of-year, etc.) are possible and within the scope of the invention. FIG. 2. shows a flowchart of the preferred embodiment for the multi-seasonal exponential smoothing method of the invention.

The forecasting method of the invention is explained using the following notation:

D(t) is the actual recorded value of the time series at time t,
L(t): an estimate of the level of the times series at time t,
T(t): an estimate of the slope of the time series at time t,
S(t): an estimate of the effects of Seasonal Pattern 1 at time t,
C(t): an estimate of the effects of Seasonal Pattern 2 at time t,
m: length (in periods) of a cycle of Seasonal Pattern 1,
n: length (in periods) of a cycle of Seasonal Pattern 2.

Without losing generality, the description of the method is provided for the case with n>=m.

Two versions of the double seasonal exponential smoothing method of the invention are presented. The first version (referred to as "Method 1" in the remainder of this document) is a hybrid exponential smoothing method where the effects of one seasonal pattern are multiplicative and the other seasonal pattern are additive. In the second version (referred to as "Method 2" in the remainder of this document), the effects of both seasonal patterns are additive.

Method 1: Method 1 is expressed by the following four equations:

Level:

$$L(t)=\alpha((D(t)-S(t-m))/C(t-n))+(1-\alpha)(L(t-1)+T(t-1)) \qquad (1)$$

Trend:

$$T(t)=\beta(L(t)-L(t-1))+(10\beta)T(t-1) \qquad (2)$$

Seasonal cycle 1:

$$S(t)=\pi[D(t)-(L(t)C(t-n))]+(1-\pi)S(t-m) \qquad (3)$$

Seasonal cycle 2:

$$C(t)=\gamma(D(t)-S(t-m))/L(t))+(1-\gamma)C(t-n) \qquad (4)$$

The smoothing constants $\alpha$, $\beta$, $\gamma$, and $\pi$, used in (1)-(4) are all between zero and one.

Forecast for a period that is $\tau(\tau \geqq 0)$ periods ahead of last observed period period t is obtained by the following equation:

$$F(t+\tau)=(L(t)+\tau T(t))C(t-n+\tau)+S(t-m+\tau) \qquad (5)$$

Method 2: Method 2 is expressed by the following four equations:
Level:
$$L(t)=\alpha((D(t)-S(t-m)-C(t-n))+(1-\alpha)(L(t-1)+T(t-1)) \quad (6)$$
Trend:
$$T(t)=\beta(L(t)-L(t-1))+(1-\beta)T(t-1) \quad (7)$$
Seasonal cycle 1:
$$S(t)=\pi(D(t)-(L(t)+C(t-n)))+(1-\pi)S(t-m) \quad (8)$$
Seasonal cycle 2:
$$C(t)=\gamma(D(t)-(L(t)+S(t-m)))+(1-\gamma)C(t-n) \quad (9)$$

The forecast for a period that is $\tau$ ($\tau \geq 0$) periods ahead of current period t is obtained by the following equation:
$$F(t+\tau)=(L(t)+\tau T(t))+C(t-n+\tau)+S(t-m+\tau) \quad (10)$$

Equations (1)-(10) are recursive in nature and require initial level, trend and seasonal factor values. To initialize Method 1 and Method 2, any of the known initialization methods available for the well known triple exponential smoothing method can be applied (Gardner 1985, Makridakis et al. 1998).

The above methods are exemplary, and a person with ordinary skill in art will appreciate that many variations are possible. For example, the multiplicative or additive seasonality may be used with both patterns. The effects of the seasonal pattern with the shorter cycle length may also be multiplicative in the method of invention. Furthermore, it is envisioned that a time series may have other forms of trend including constant level with no trend, exponential or damped trend. These variations of Method 1 and Method 2 of the present invention can be easily formed by modifying equations (1)-(5) and (6)-(10) for constant level, exponential trend, and damped trend similar to Gardner (1985) and within the scope of the invention. Moreover, although Methods 1 and 2 of the invention are described for time series with two seasonal patterns, a person with ordinary skills in the art will appreciate that their extensions to three or more seasonal patterns are within the scope of the invention and can be carried out in the same manner described in (1)-(5) and (6)-(10).

II. Seasonal Sub-Series Method

Figure 5:
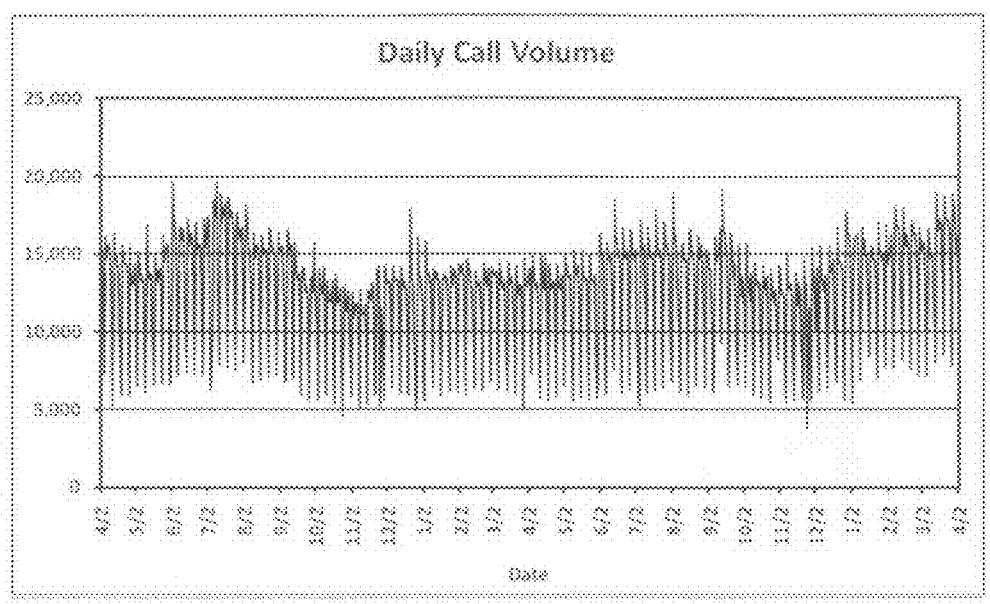
FIG. 5. illustrates a daily time series with multiple seasonal cycles that include the day-of-week as well as the week-of-year patterns.
Figure 6:
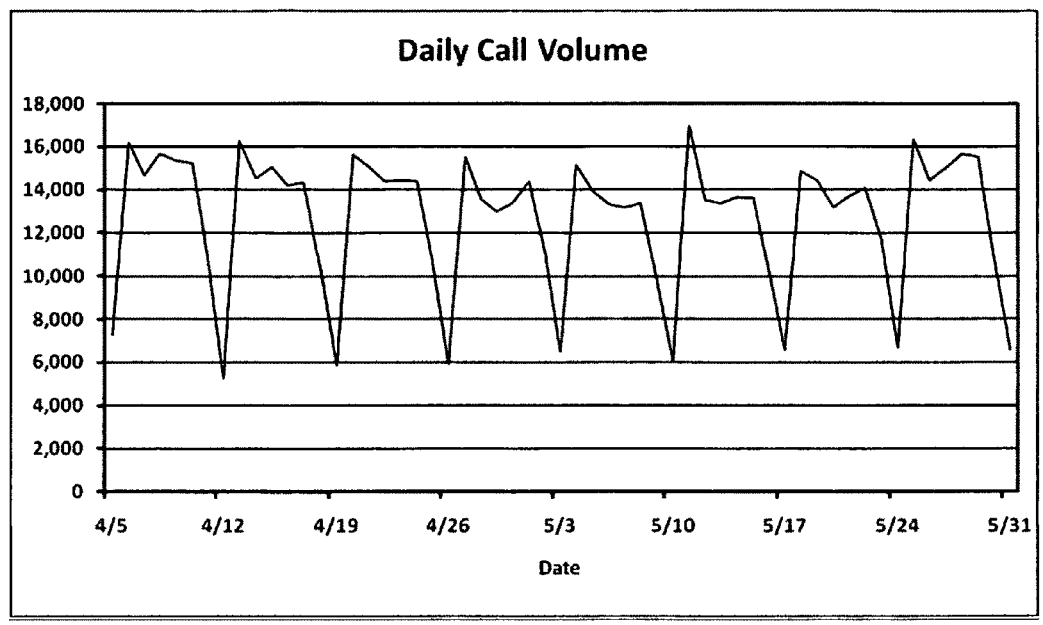
FIG. 6. illustrates the day-of-week seasonal cycle in a time series.

The seasonal sub-series method of the invention is illustrated for a time series involving daily values with two seasonal patterns: the day-of-week pattern that is called Seasonal Pattern 1, and the week-of-year pattern called Seasonal Pattern 2. A time series with these types of seasonal patterns is shown in FIG. 5 and FIG. 6. A description of the method of the invention is provided for a time series with two Seasonal Patterns with lengths m and n. However, these descriptions of the seasonal sub-series method of the invention are exemplary, and it should be clear to a person with ordinary skills in the art that the method of the invention is applicable to the time series with multiple seasonal patterns and other combinations of seasonal patterns (e.g. any number and combination of the intra-day, day-of-week, week-of-month, day-of-quarter, week-of-quarter, month-of-quarter, day-of-month, day-of-year, week-of-year, month-of-year, etc.)

Figure 8:
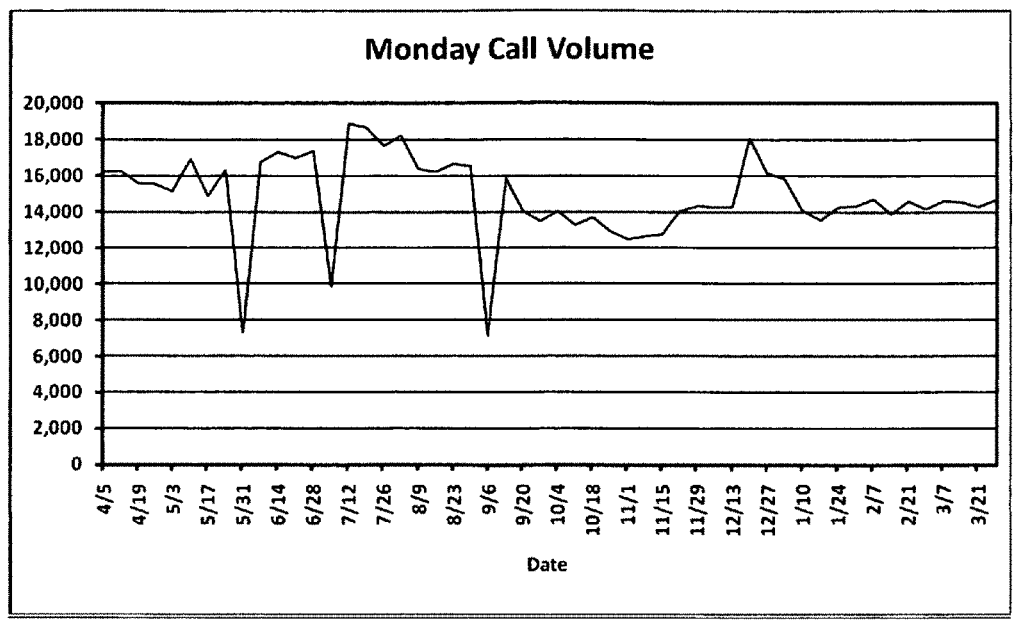
FIG. 8. shows the sub-series for Monday used in the seasonal sub-series method.
Figure 9:
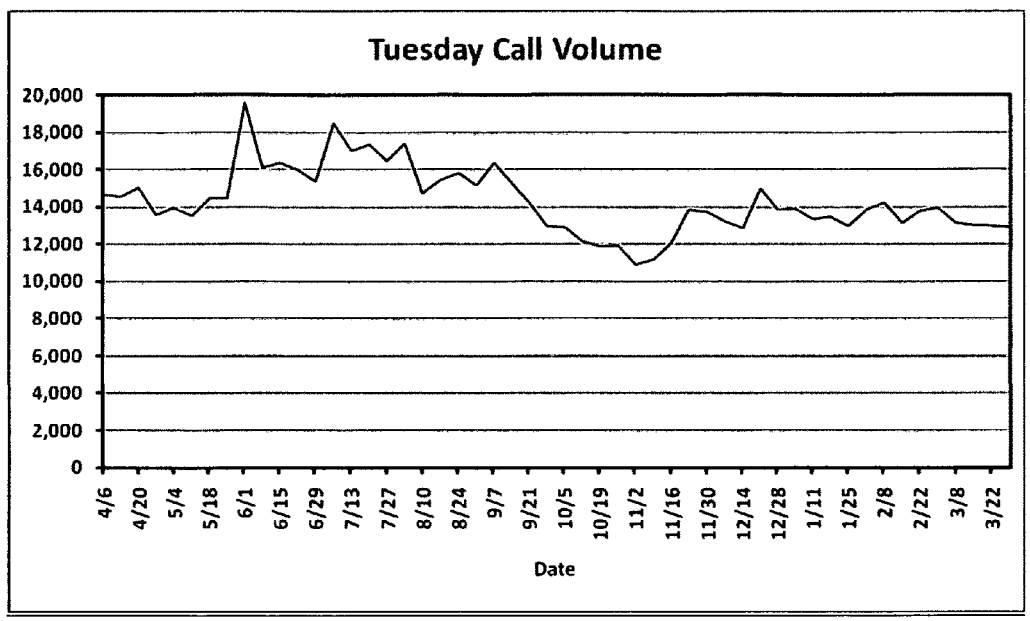
FIG. 9. shows the sub-series for Tuesday used in the seasonal sub-series method.

FIG. 3A and FIG. 3B. shows a flowchart of the preferred embodiment for the seasonal sub-series method of the invention. In step 20, the number of seasonal patterns and the number of time periods in each cycle of a seasonal pattern are inputted. In the illustrative case considered, the cycle length of Seasonal Pattern 1 is 7 days, and Seasonal Pattern 2 is 52 weeks. The seasonal pattern with the shortest length is identified in step 22 next. The time series is then split into sub-series in step 23 so that there will be one sub-series for each repeating period in the cycles of the seasonal pattern with the shortest length. Thus, in the case considered, the shortest cycle is Seasonal Pattern 1 with 7 periods (days). In this case, the method of the present invention separates the time series data into 7 sub-series so that each sub-series contains data for one repeating period in the cycles of this seasonal pattern. For example, a sub-series is formed by taking the time series values for all past Mondays only, as shown in FIG. 8. Likewise, the time series values for all past Tuesdays form a second sub-series, as shown in FIG. 9, and so on.

Each sub-series formed will exhibit one less seasonal pattern since the seasonal pattern with the shortest length will be embedded in the sub-series formed. In the case assumed, each sub-series will exhibit only Seasonal Pattern 2, and the cycle length of this seasonal pattern in each sub-series is now 52 periods in a regular, non-leap year.

A forecasting method (such as an exponential smoothing, ARIMA, or any other method) is then selected in step 24 to forecast the future values for each sub-series separately. That is, future values of the sub-series for Mondays are forecasted in step 25 using only the Monday sub-series. Likewise, future values of the sub-series for Tuesdays are forecasted in step 25 using only the Tuesday sub-series, and so on. If the forecasting method used 24 is capable of predicting and including the effects of one or more seasonal patterns, then such seasonal patterns will be included in forecasting each sub-series. In the case assumed, if the triple exponential smoothing method is used, for example, the week-of-year seasonal pattern (Seasonal Pattern 2) is included in forecasting the future values of each sub-series.

Forecasts for the whole time series are then obtained by merging sub-series forecasts generated into one set of forecasts in step 26. The sub-series forecasts are merged in the time order they are generated so that, for instance, the forecast for the first Monday in the forecast horizon of the original time series will be the first forecasted value for the Monday sub-series, the forecast for the first Tuesday of the original time series will be the first forecasted value for the Tuesday sub-series, and so on. The forecasts are stored in the database in step 27.

The method of the invention is described using the notation introduced before. As before, the length of the shortest seasonal pattern found in step 22 is denoted by m, and the length of the second seasonal pattern is by n. If the time series considered has data for the last K time periods, {D(1), D(2), . . . , D(K)}, then the method of the invention splits the time series in m sub-series in step 23 as follows:
Sub-series 1:
$$\{D(1), D(1+m), D(1+2m), \ldots , D(1+km)\}, \quad (11)$$
Sub-series 2:
$$\{D(2), D(2+m), D(2+2m), \ldots , D(2+km)\}, \quad (12)$$
Sub-series m:
$$\{D(m), D(m+m), D(m+2m), \ldots , D(m+km)\}, \quad (13)$$
where K=(m+km).

If $H_i(.)$ represents the forecasting method selected in step 24 to forecast the values of sub-series i, then the forecast of future values of sub-series i for period (i+km+tm), t=1, . . . , T, (i.e. period i of $((k+1)+t)^{th}$ cycle of the seasonal pattern with the shortest length), is generated in step 25 as follows:
$$F_{(i+km+tm)}=H_i(tm|D(i), D(i+m), D(i+2m), \ldots , D(i+km)) \ t=1, \ldots , T \quad (14)$$

where H(.) uses the time series values {D(i), D(i+m), D(i+2m), . . . , D(i+km)} to generate forecasts for period i of $(k+1)+t)^{th}$ cycle of the seasonal pattern with the shortest length.

This process generates a set of forecasts for each sub-series independently as follows:

Sub-series 1:

$$\{F_{(1+km+m)}, F_{(1+km+2m)}, F_{(1+km+3m)}, \ldots, F_{(1+km+Tm)}\}, \quad (15)$$

Sub-series 2:

$$\{F_{(2+km+m)}, F_{(2+km+2m)}, F_{(2+km+3m)}, \ldots, F_{(2+km+Tm)}\}, \quad (16)$$

Sub-series m:

$$\{F_{(m+km+m)}, F_{(m+km+2m)}, F_{(m+km+3m)}, \ldots, F_{(m+km+Tm)}\}. \quad (17)$$

Different forecasting methods may be used for different sub-series. Furthermore, if the methods selected include one or more seasonal patterns and trend, then Seasonal Pattern 2 as the seasonal pattern in the sub-series is included in generating forecasts in addition to trend, if exists.

The sub-series forecasts in (15)-(17) are then merged in step 26 to obtain the forecasts for the whole time series as follows.

$$\{F_{(1+km+m)}, F_{(2+km+m)}, \ldots, F_{(m+km+m)}, F_{(1+km+2m)}, F_{(2+km+2m)}, \ldots, F_{(m+km+2m)}, F_{(1+km+3m)}, F_{(2+km+3m)}, \ldots, F_{(m+km+3m)}, \ldots, F_{(1+km+Tm)}, F_{(2+km+Tm)}, \ldots, F_{(m+km+Tm)}\} \quad (18)$$

The above description of the seasonal sub-series method is exemplary, and a person with ordinary skills in art will appreciate that many variations are possible. For example, if the multi-seasonal exponential smoothing method of the invention is selected in step 24 for forecasting the future values of a sub-series, this will allow capturing the effects of more than two seasonal patterns (e.g. the day-of-week, week-of-month, and month-of-year). Moreover, the number of data values in the time series K may be greater than (k+1)m but less than (k+2)m, for any k, indicating the existence of data in the history for a partial cycle of the seasonal pattern with the shortest length (that is, the first few periods of the $(k+2)^{nd}$ cycle). In this case, there will be one or more data points than (k+1)m in some of (11)-(13). As a result, no forecasts will be generated for the periods in the $(k+2)^{nd}$ cycle for which the actual time series values are available. Forecasts will only be generated for the remaining portion of the $(k+2)^{nd}$ cycle. The method of the invention will apply as described in this case over the forecast horizon.

III. Aggregate-to-Period Forecasting Method

The aggregate-to-period forecasting method of the invention is first described for a time series involving daily totals (e.g. the number of calls received during the day) with two seasonal patterns: the day-of-week pattern called Seasonal Pattern 1, and the week-of-year pattern called Seasonal Pattern 2. In the illustrative case considered, the cycle length of Seasonal Pattern 1 is 7 days, and Seasonal Pattern 2 is 52 weeks. An example time series with these types seasonal patterns is shown in FIG. 5 and FIG. 6. A description of the method of the invention is provided for a time series with period totals for an activity with two seasonal patterns with lengths m and n. However, this description of the aggregate-to-period method of the invention is exemplary, and a person with ordinary skills in the art will appreciate that the method of the invention is applicable to the time series with multiple seasonal cycles and other combinations of seasonal cycles (e.g. any number and/or combination of the intra-day, day-of-week, week-of-month, day-of-quarter, week-of-quarter, month-of-quarter, day-of-month, day-of-year, week-of-year, month-of-year, etc.)

FIG. 4A and FIG. 4B shows a flowchart of the preferred embodiment for the aggregate-to-period method of the invention. In step 32, the number of seasonal patterns and the number of time periods in each cycle of a seasonal pattern are inputted. The aggregate-to-period forecasting method of the invention first finds the seasonal pattern with the shortest cycle length in step 34. For the time series assumed in this description, this is the Seasonal Pattern 1 with a cycle length of 7 days. The method of the invention then aggregates the time series values in step 35 for each cycle of Seasonal Pattern 1 to calculate the combined time series value for each occurrence of Seasonal Pattern 1 in the time series history. Thus, each aggregated value is associated with a cycle of Seasonal Pattern 1. A forecasting method is selected in step 36. The aggregate-to-period forecasting method of the invention then applies the forecasting method selected to generate forecasts in step 37 for the aggregated future cycles of the seasonal pattern with the shortest length. If the forecasting method selected is capable of modeling at least one seasonal cycle, it captures and includes the effects of Seasonal Pattern 2 in forecasting the aggregated values for future occurrences of Seasonal Pattern 1.

Once the aggregated values are forecasted, the next step is to process each aggregated period forecast further to obtain the forecasts for each period of a cycle of Seasonal Pattern 1. For this purpose, the aggregate-to-period forecasting method of the present invention forecasts a period factor for each period in the future cycles of Seasonal Pattern 1 in steps (38)-(39). A number of methods can be used to generate the period factors including the triple exponential smoothing or ARIMA method. With the period factors, the effects of Seasonal Patter 1 are captured in this step. Consequently, the aggregate-to-period method captures and includes both seasonal patterns in forecasting future values of the original times series. The period factors are then multiplied with the aggregate period forecasts to generate period forecasts in step 40. The forecasts are stored in the database in step 41.

The method of the invention is described using the notation introduced before. The length of the shortest seasonal pattern found in step 34 is denoted by m, and the length of the second seasonal pattern is by n. If the time series considered has data for K time periods, $\{D(1), D(2), \ldots, D(K)\}$, K=(k+1) m for some k>0 and integer, then the method of the invention splits the time series into n cycles of the seasonal pattern with the shortest length as follows:

Cycle 1:

$$\{D(1), D(2), D(3), \ldots, D(m)\}, \quad (19)$$

Cycle 2:

$$\{D(m+1), D(m+2), D(m+3), \ldots, D(m+m)\}, \quad (20)$$

Cycle (k+1):

$$\{D(km+1), D(km+2), D(km+3), \ldots, D(km+m)\}, \quad (21)$$

where K=(m+km).

The aggregated time series values are found in step 35 as follows.

$$AD(j) = \Sigma_{l=(j-1)m+1}^{jm} D(l) \quad (22)$$

where AD(j) is the aggregated time series value (that is, $j^{th}$ aggregate period) for the $j^{th}$ cycle of Seasonal Pattern 1.

If $H_i(.)$ represents the forecasting method selected in step 36 to forecast the values of the aggregated time series, then the forecasts of future values of aggregated period ((k+1)+t), t=1,...,T, (i.e. $((k+1)+t)^{th}$ aggregated period), is generated in step 37 as follows:

$$AF_{((k+1)+1)} = H(t|AD(1), AD(2), AD(3), \ldots, AD(k+1))$$
$$t=1, \ldots, T. \quad (23)$$

The method of the invention then applies the forecasting method selected in step 38 to the un-aggregated time series values (i.e. original time series values) to obtain the period factors. However, the forecasting method used to forecast the future values of the aggregated time series and the period factors do not have to be the same. The triple exponential smoothing, ARIMA, a multi-seasonal exponential smoothing method or any other method that can capture at least one seasonal pattern can be used for period factors. For this purpose, the forecasting method is applied to the original (un-aggregated) time series to generate un-aggregated period forecasts for the future cycles of Seasonal Pattern 1. These forecasts are used to obtain the period factors only. Let the period forecasts for the periods in the $t^{th}$ future cycle of Seasonal Cycle 1, $t>(k+1)$, be given by $\{f_{(t-1)m+1}, f_{(t-1)m+2}, \ldots, f_{(t-1)m+m}\}$ with, $f_{(t-1)m+i}$ representing the forecast for period i of the $t^{th}$ cycle considered. Then the period factors are calculated in step 39 as $$s_{(t-1)m+i} = [f_{(t-1)m+i}/(\Sigma^m_{l=1} f_{(t-1)m+l})], \quad (24)$$

where $s_{(t-1)m+i}$, $1 \leq i \leq m$, is the fraction of the aggregate forecast for the seasonal cycle t attributed to period i of that cycle. When calculated using (24), $s_{(t-1)m+i}$ includes both trend and seasonal effects. Also note that $\Sigma_{l}^{1} s_{(t-1)m+l} = 1$.

Let the aggregate forecast for $t^{th}$ future occurrence of Seasonal Cycle 1 be $AF_t$. Then the forecasts for the periods in $t^{th}$ cycle are obtained in step 40 as $$F_{((t-1)+i)} = s_i(AF_t), \quad (25)$$

where $1 \leq i \leq m$.

The forecast horizon may include more than one cycle of Seasonal Pattern 1. In this case, the period factor forecasting step described here is repeated for each future cycle of Seasonal Pattern 1 to obtain the period forecasts, and using them as the period factor values for each cycle. Period forecasts for a cycle of Seasonal Pattern 1 are then obtained using the period factors forecasted for each future cycle and aggregate period forecast. The forecasts are stored in the database in step 41.

This description of the aggregate-to-period forecasting method of the invention is exemplary, and a person with ordinary skills in the art will appreciate that many variations are possible. For example, the aggregate-to-period forecasting method of the invention may be modified to forecast time series with more than two seasonal patterns by further aggregating the time series values over the seasonal cycle with the second longest cycle length in step 35. Thus the aggregated time series will have only the seasonal pattern with the longest cycle length. After the forecasts for the future values of the aggregated cycles are obtained with a forecasting method that can model and include trend and seasonal effects of the longest seasonal cycle in step 37, they can be broken into forecasts for the multiple seasonal cycles with shorter lengths, one seasonal pattern at a time, by repeating the steps (38)-(40). Thus, the forecasts of aggregated periods are first broken into forecasts for the aggregated periods of the seasonal cycle with second longest cycle length. These forecasts are then further broken down into forecasts for the periods of the cycles of the seasonal pattern with the shortest cycle lengths. Thus, for example, if a time series exhibits the intra-day (e.g. data for 30-minute intervals), the day-of-week, and week-of-year patterns, the method of the invention finds the aggregated weekly time series values for each week in step 35. Forecasts of weekly aggregated time series values are generated in step 37 using a forecasting method that can capture the week-of-year patterns and any trend that may exist. These weekly forecasts are then broken down into daily forecasts in step (40) by using the daily factors obtained in steps (38) and (39). The daily forecasts obtained are then broken down into interval forecasts is step (40) using the interval factors obtained by repeating steps (38) and (39).

Likewise, it should be clear to a person with ordinary skills in the art that the method of the invention may be used with a multi-seasonal exponential smoothing method, and the seasonal sub-series method of the invention to forecast the future values of a time series with multiple seasonal cycles.

Figure 7:
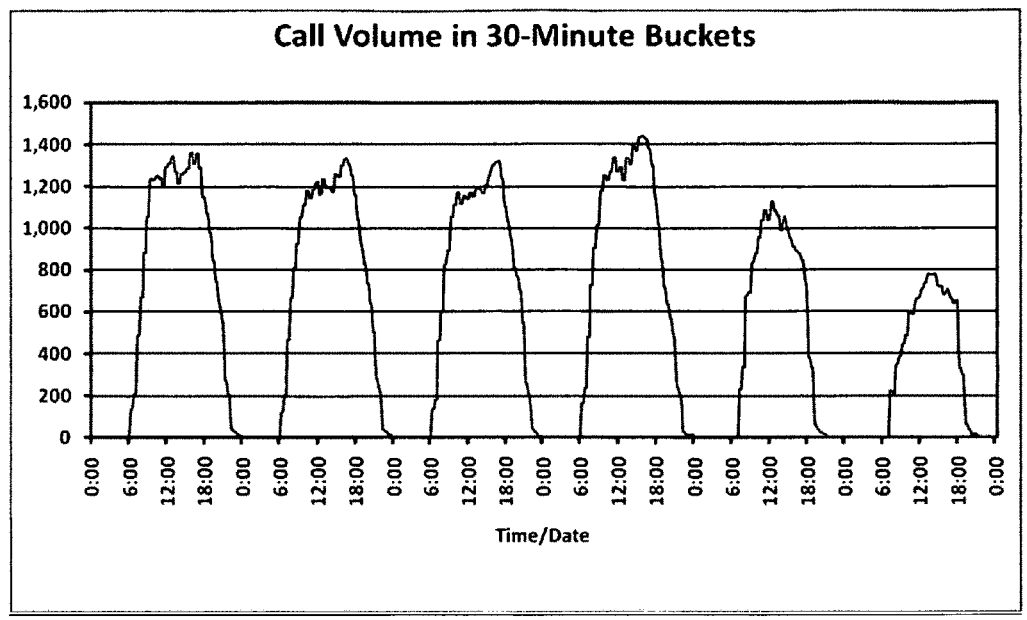
FIG. 7. illustrates the intra-day seasonal cycle in a time series.

Furthermore, three methods of the invention can be used in combination to forecast future values for even 5-, 15-, 30-minute periods that may show daily seasonal patterns. An example time series with intra-day seasonality is shown in FIG. 7. This type of daily seasonal patterns is common in contact (call, email, chat, etc.) arrivals and service times for these arrivals at call centers, energy consumption, arrivals at a bank, etc. Besides the seasonal pattern during a day, a time series may also have seasonal patterns that may repeat over the days of a week. Moreover, there may be a weekly seasonal pattern occurring over a fixed number of weeks such as every month (repeating every 4 weeks), quarter (repeating every 13 weeks), and year (repeating every 52 weeks). In this case, the time series values observed in each period during a day are summed to obtain the daily totals. The future values for the aggregated daily times series are then obtained using the multi-seasonal exponential smoothing method and/or the seasonal sub-series method. Alternatively, each of the seasonal sub-series or aggregate-to-period forecasting methods of the invention may be applied alone. Once the forecasts of the future values for the daily times series are obtained, each daily forecast is broken down into forecasts for 5-, 15-, or 30-minute interval forecasts using the period factors (for each interval during a day) of the aggregate-to-period forecasting method of the invention.

Moreover, a time series may consist of the values of a summary statistic such as the average service time (also called "average handling time") per customer at a call center instead of the period totals for an activity such as the number of calls received in a 30-minute interval. In this case, one approach is to determine the sum of period statistics to obtain the total statistic value for an aggregate period. The aggregate-to-period method of the invention then generates period forecasts as described before. Yet in another version of the aggregate-to-period forecasting method of the invention, aggregated values in step 35 are not the sum of the statistic values observed in each period over an aggregate period (a seasonal cycle) but a recalculation of the statistic over that aggregate period. For example, if the average handling time per call at a call center for a particular call type is considered, it may initially be stored as the average handling time for each 30-minute interval (i.e. calculating the average handling time for the calls answered in a particular 30-minute interval). The aggregate value for the average handling time for a day can be taken as the average handling time for all calls answered during the day. Likewise, the average handling time for a week can be taken as the average of the handling times for all calls answered during the week. In this case, the period factors are calculated for the past periods first. Forecasts of period factors are then generated to obtain the period forecasts of the statistic. Thus, first, for each period in the history of the time series, a period factor is determined by taking the ratio of the value of the statistic observed in the period to the aggregate statistic value calculated for the aggregate period (a cycle). The ratios over the history provide a time series for periods that can be used to generate the period ratio forecasts. For this purpose, a forecasting method that can model the trend and seasonal patterns is selected. These forecasts are also the period factor forecasts, $s_{(t-1)m+i}$. To obtain the period forecasts of the statistic, equation (25) is used with the period factors obtained this way. Thus, period ratios forecasts are generated for each interval during a day. These ratios are then multiplied with the forecasted value of the statistic for that day to obtain the interval forecasts for the statistic.

Accordingly, it is to be understood that the embodiments of the invention herein described are merely illustrative of the application of the principles of the invention. It will be clear to one skilled in the art that the above embodiment may be altered or supplemented in many ways without departing from the scope of the invention. References herein to details of the illustrated embodiments are not intended to limit the scope of claims, which themselves recite those features regarded as essential to the invention.

What is claimed is:

1. A computer implemented method for forecasting the future values of a time series with multiple seasonal patterns comprising: executing, by one or more computers, the steps of:
    (i) providing a plurality of data values for the time series, together with time information relating to said data values;
    (ii) inputting history start and end dates for the data values inputted to be used in forecasting;
    (iii) inputting a forecast horizon start and end dates to specify over which dates forecasts are to be generated;
    (iv) inputting a length of a cycle of the first seasonal pattern and a length of a cycle of the second seasonal pattern wherein the cycle of the second seasonal pattern is different than the cycle of the first seasonal pattern;
    (v) determining whether the effect of the first seasonal pattern and the second seasonal pattern, are additive or multiplicative;
    (vi) inputting the values of smoothing constants, all between 0 and 1;
    (vii) using a hybrid double seasonal exponential smoothing level prediction equation recursively starting from the oldest observation to the newest observation to forecast a level value when the effect of the first seasonal pattern is multiplicative and the second seasonal pattern is additive or using an additive double seasonal exponential smoothing level prediction equation to forecast a level value when the effect of the first seasonal pattern and the second seasonal pattern are both additive;
    (viii) using a hybrid double seasonal exponential smoothing trend prediction equation recursively starting from the oldest observation to the newest to forecast a trend value when the effect of the first seasonal pattern is multiplicative and the second seasonal pattern is additive or using an additive double seasonal exponential smoothing trend prediction equation to forecast a trend value when the effect of the first seasonal pattern and the second seasonal pattern are both additive;
    (ix) using two hybrid double seasonal exponential smoothing seasonal factor prediction equations recursively starting from the oldest observation to the newest to forecast seasonal factors for each seasonal cycle of the first seasonal pattern and the second seasonal pattern when the effect of the first seasonal pattern is multiplicative and the second seasonal pattern is additive or using an additive double seasonal exponential smoothing seasonal factor prediction equation to forecast seasonal factors for each seasonal cycle of the first seasonal pattern and the second pattern when the effect of the first seasonal pattern and the second seasonal pattern are both additive;
    (x) including in steps (iv) to (ix) any additional seasonal patterns that exist in the time series;
    (xi) combining the predicted values of level, trend, and seasonal factors for all seasonal patterns and calculating forecasts of the future values of the time series;
    (xii) storing the forecasts of the future values of the time series.

2. The method of claim 1 wherein the time series exhibits at least two seasonal patterns.

3. The method of claim 2 wherein the future effects of seasonal patterns may be additive for some seasonal patterns and multiplicative for the others.

4. The method of claim 1 wherein the future values of the level, trend, and seasonal factors are calculated, if some seasonal patterns are additive and some are multiplicative, as follows:
    (xii) the level value is calculated as follows:
    $$L(t)=\alpha((D(t)-S(t-m))/C(t-n))+(1-\alpha)(L(t-1)+T(t-1))$$
    where
    D(t) is an actual recorded value of the time series at time t,
    L(t): is an estimate of the level of the times series at time t,
    T(t): is an estimate of the slope of the time series at time t,
    S(t): is an estimate of the effects of Seasonal Pattern 1 at time t,
    C(t): is an estimate of the effects of Seasonal Pattern 2 at time t,
    m: is a length (in periods) of a cycle of Seasonal Pattern 1,
    n: is a length (in periods) of a cycle of Seasonal Pattern 2,
    $\alpha$: is a smoothing constant between zero and one; and
    (xiii) the trend value is calculated as follows:
    $$T(t)=\beta(L(t)-L(t-1))+(1-\beta)T(t-1)$$
    where
    $\beta$: is a smoothing constant between zero and one; and
    (xiv) the seasonal factor values for the seasonal patterns with additive seasonality are calculated as follows:
    $$S(t)=\pi(D(t)-(L(t)C(t-n)))+(1-\pi)S(t-m)$$
    where
    $\pi$: is a smoothing constant between zero and one; and
    (xv) the seasonal factor values for the seasonal patterns with multiplicative seasonality are calculated as follows:
    $$C(t)=\gamma((D(t)-S(t-m))/L(t)))+(1-\gamma)C(t-n)$$
    where
    $\gamma$: is a smoothing constant between zero and one.

5. The method of claim 4 wherein forecasts for a period that is $\tau$ ($\tau\geq 0$) periods from time t for which the last recorded value of the time series exists are calculated as follows:
    $$F(t+\tau)=(L(t)+\tau T(t))C(t-n+\tau)+S(t-m+\tau).$$

6. The method of claim 1 wherein the future values of the level, trend, and seasonal factors are calculated, if all seasonal patterns are additive, as follows:
    (xvi) the level value is calculated as follows:
    $$L(t)=\alpha((D(t)-S(t-m)-C(t-n))+(1-\alpha)(L(t-1)+T(t-1));$$
    and
    (xvii) the trend value is calculated as follows:
    $$T(t)=\beta(L(t)-L(t-1))+(1-\beta)T(t-1);$$
    and
    (xviii) the seasonal factor values for Seasonal Pattern 1 are calculated as follows:
    $$S(t)=\pi(D(t)-(L(t)+C(t-n)))+(1-\pi)S(t-m);$$
    and
    (xix) the seasonal factor values for Seasonal Pattern 2 and all other seasonal patterns other than Seasonal Patterns 1 and 2 are calculated as follows:
    $$C(t)=\gamma(D(t)-(L(t)+S(t-m)))+(1-\gamma)C(t-n).$$

7. The method of claim 6 wherein the forecasts are for a period that is τ (τ≧0) periods from time t for which the last recorded value of the time series exists are calculated as follows:

$$F(t+\tau)=(L(t)+\tau T(t))+C(t-n+\tau)+S(t-m+\tau).$$

8. A computer implemented method for forecasting the future values of a time series with multiple seasonal patterns of claim 1 further comprising the steps of:
(xiii) finding a seasonal cycle with a shortest cycle length;
(xiv) splitting the time series into sub-series, one for each period in a cycle of the seasonal pattern with the shortest cycle length;
(xv) selecting one or more forecasting methods that, in addition to trend, can forecast additive or multiplicative seasonal factors, for one or more seasonal patterns and include them in forecasting the future values of a time series;
(xvi) using the selected forecasting methods to forecast the future values of each sub-series by including the effects of trend and all seasonal patterns that exist in the sub-series;
(xvii) combining the forecasts of all sub-series in a correct time order to obtain the forecasts of the future values of the time series;
(xviii) storing the forecasts of the future values of the time series.

9. The method of claim 8 wherein the time series exhibits at least two seasonal cycles.

10. The method of claim 8 wherein, a set of forecasts for each sub-series is generated independently as:

Sub-series 1:

$$\{F_{(1+km+m)}, F_{(1+km+2m)}, F_{(1+km+3m)}, \ldots, F_{(1+km+Tm)}\},$$

Sub-series 2:

$$\{F_{(2+km+m)}, F_{(2+km+2m)}, F_{(2+km+3m)}, \ldots, F_{(2+km+Tm)}\},$$

Sub-series m:

$$\{F_{(m+km+m)}, F_{(m+km+2m)}, F_{(m+km+3m)}, F_{(m+km+Tm)}\},$$

where
$F_{(i+km+jm)}$ is the forecast for the subseries in the $j^{th}$ future cycle; and
the subseries forecasts are merged to obtain the forecasts for the whole time series as follows $$\{F_{1+km+m}, F_{(2+km+m)}, \ldots, F_{(m+km+m)}, F_{(1+km+2m)}, F_{(2+km+2m)}, \ldots, F_{(m+km+2m)}, F_{(1+km+3m)}, F_{(2+km+3m)}, \ldots, F_{(m+km+3m)}, \ldots, F_{(1+km+Tm)}, F_{(2+km+Tm)}, \ldots, F_{(m+km+Tm)}\}.$$

11. The computer implemented method for forecasting the future values of a time series with multiple seasonal patterns claim 1 further comprising the steps of:
(xiii) finding the seasonal cycle with the shortest cycle length;
(xiv) for each cycle of a seasonal pattern with a shortest cycle length, aggregating the time series values observed in that cycle to form a time series of aggregated values for cycles aggregated into aggregated periods;
(xv) selecting a first forecasting method that can, in addition to trend, forecast additive or multiplicative seasonal factors, for one or more seasonal patterns and include them in forecasting the future values of the time series;
(xvi) using the first forecasting method to forecast the future values of the aggregated time series with one or more of the seasonal cycles exhibited by the aggregated time series;
(xvii) selecting a second forecasting method that, in addition to trend, can forecast the seasonal factor values for the periods of the seasonal cycle with the shortest cycle length;
(xviii) using the second forecasting method to obtain the period forecasts for the periods of the seasonal cycle with the shortest cycle length using an un-aggregated time series;
(xix) using the period forecasts to forecast the period factor values for the periods of the seasonal cycle with the shortest cycle length;
(xx) breaking the forecasts of the aggregated time series by multiplying the period factors for each period of a cycle with the aggregate period forecast for the cycle to obtain the forecasts for the periods in the future cycle of the seasonal pattern with the shortest length;
(xxi) storing the forecasts of the future values of the time series.

12. The method of claim 11 wherein the time series exhibits at least two seasonal cycles.

13. The method of claim 11 wherein the time series forecasted may consist of values of a statistic calculated over a period of time.

14. The method of claim 13 wherein an aggregate statistic for an aggregate period is obtained by re-calculating it over the aggregate period.

15. The method of claim 13 wherein the period factors for the past periods are obtained by taking the ratio of the value of the statistic for a period to the value of the statistic for the aggregate period including it.

16. The method of claim 13 wherein the period factor forecasts are obtained by applying a third forecasting method to the past period factors.

17. A non-transitory computer readable medium including a computer program stored thereon when executed by a computer performs a method of forecasting the future values of a time series, comprising:
(i) providing a plurality of data values for the time series, together with time information relating to said data values;
(ii) inputting history start and end dates for the data values inputted to be used in forecasting;
(iii) inputting a forecast horizon start and end dates to specify over which dates forecasts are to be generated;
(iv) inputting a length of a cycle of the first seasonal pattern and a length of a cycle of the second seasonal pattern wherein the cycle of the second seasonal pattern is different than the cycle of the first seasonal pattern;
(v) determining whether the effect of the first seasonal pattern and the second seasonal pattern, are additive or multiplicative;
(vi) inputting the values of smoothing constants, all between 0 and 1;
(vii) using a hybrid double seasonal exponential smoothing level prediction equation recursively starting from the oldest observation to the newest observation to forecast a level value when the effect of the first seasonal pattern is multiplicative and the second seasonal pattern is additive or using an additive double seasonal exponential smoothing level prediction equation to forecast a level value when the effect of the first seasonal pattern and the second seasonal pattern are both additive;
(viii) using a hybrid double seasonal exponential smoothing trend prediction equation recursively starting from the oldest observation to the newest to forecast a trend value when the effect of the first seasonal pattern is multiplicative and the second seasonal pattern is additive or using an additive double seasonal exponential smoothing trend prediction equation to forecast a trend value when the effect of the first seasonal pattern and the second seasonal pattern are both additive;

(ix) using two hybrid double seasonal exponential smoothing seasonal factor prediction equations recursively starting from the oldest observation to the newest to forecast seasonal factors for each seasonal cycle of the first seasonal pattern and the second seasonal pattern when the effect of the first seasonal pattern is multiplicative and the second seasonal pattern is additive or using an additive double seasonal exponential smoothing seasonal factor prediction equation to forecast seasonal factors for each seasonal cycle of the first seasonal pattern and the second pattern when the effect of the first seasonal pattern and the second seasonal pattern are both additive;

(x) including in steps (iv) to (ix) any additional seasonal patterns that exist in the time series;

(xi) combining the predicted values of level, trend, and seasonal factors for all seasonal patterns and calculating forecasts of the future values of the time series;

(xii) storing the forecasts of the future values of the time series.

18. The non-transitory computer readable medium of claim 17 further including the program stored thereon when executed by the computer performs the method of forecasting the future values of a time series further comprising:

determining a seasonal pattern with the shortest length;

splitting the time series into sub-series, wherein one said sub-series is selected for each seasonal period in the seasonal cycle with the shortest cycle length;

selecting a third forecasting method that can forecast seasonal factors and include them in forecasting the future values of a time series;

using the third forecasting method to forecast future values of each sub-series with one or more of the seasonal cycles exhibited by each sub-series being predicted and included in forecast by the selected method;

combining the forecast of all sub-series in a correct time order to obtain forecasts of the future values of the time series.

19. The non-transitory computer readable medium of claim 17 further including the program stored thereon when executed by the computer performs the method of forecasting the future values of a time series further comprising:

determining a seasonal pattern with the shortest length;

aggregating the time series values observed in each cycle of the seasonal pattern with the shortest length to form a time series of aggregated values with the periods in each cycle aggregated into an aggregated period;

selecting a fourth forecasting method;

using the fourth selected forecasting method to forecast the future values of the aggregated time series with one or more of the seasonal cycles exhibited by the aggregated time series being forecasted;

selecting a fifth forecasting method that, in addition to trend, can forecast the period factor values for the periods of the seasonal cycle with the shortest cycle length;

using the fifth selected forecasting method and the smoothed time series found after applying the outlier detection algorithm to forecast the period factor values for the periods of the seasonal pattern with the shortest cycle length;

breaking the forecasts of the aggregated time series using the period factor values obtained so that each aggregated forecast value generates the forecasts for the periods in the corresponding seasonal cycle (with the shortest cycle length) of the time series in the future.

* * * * *